US011380168B2

(12) United States Patent
Saccoccio et al.

(10) Patent No.: US 11,380,168 B2
(45) Date of Patent: Jul. 5, 2022

(54) SYSTEM, APPARATUS AND METHOD FOR FACILITATING REMOTE LOTTERY WAGER COMMUNICATIONS

(71) Applicant: IGT Global Solutions Corporation, Providence, RI (US)

(72) Inventors: Jesse Saccoccio, East Greenwich, RI (US); Mark Truman, East Greenwich, RI (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 16/507,645

(22) Filed: Jul. 10, 2019

(65) Prior Publication Data

US 2019/0333340 A1  Oct. 31, 2019

Related U.S. Application Data

(63) Continuation of application No. 15/704,387, filed on Sep. 14, 2017, now Pat. No. 10,360,768.

(Continued)

(51) Int. Cl.
*G06Q 30/06* (2012.01)
*G07F 17/32* (2006.01)
(Continued)

(52) U.S. Cl.
CPC ..... *G07F 17/3288* (2013.01); *G06Q 20/3224* (2013.01); *G06Q 50/34* (2013.01);
(Continued)

(58) Field of Classification Search
CPC ............. G07F 17/3118; G07F 17/3223; G07F 17/3237; G07F 17/3239; G07F 17/3241;
(Continued)

(56) References Cited

U.S. PATENT DOCUMENTS 6,899,621 B2  5/2005  Behm et al.
7,621,810 B2  11/2009  Gilmore et al.
(Continued)

FOREIGN PATENT DOCUMENTS

WO    2016044798    3/2016

*Primary Examiner* — Lawrence S Galka
(74) *Attorney, Agent, or Firm* — Neal, Gerber & Eisenberg LLP

(57) ABSTRACT

A system, apparatus and method are presented for facilitating remote wager communications using mobile communications devices while the devices are within range of an authorized lottery transaction device. In various embodiments, lottery transaction devices are equipped with multiple Bluetooth-enabled transceivers, a lottery server manages identifiers associated with the transceivers at each lottery transaction device, and issues an identifier of an available transceiver to a requesting mobile communications device at the time the mobile device desires to consummate a player's desired transaction. Portions of the desired transaction can be communicated to the lottery server separately from the Bluetooth network to limit the time spent by a mobile device communicating directly with the Bluetooth-enabled lottery transaction device. In various embodiments, the mobile device issues a disconnect call to the lottery transaction device directly after the desired lottery transaction has been communicated.

19 Claims, 5 Drawing Sheets

Related U.S. Application Data

(60) Provisional application No. 62/552,212, filed on Aug. 30, 2017.

(51) Int. Cl.
  *G06Q 50/34*  (2012.01)
  *H04W 4/70*  (2018.01)
  *H04W 4/021*  (2018.01)
  *G06Q 20/32*  (2012.01)

(52) U.S. Cl.
  CPC ........ *G07F 17/329* (2013.01); *G07F 17/3209* (2013.01); *G07F 17/3223* (2013.01); *G07F 17/3225* (2013.01); *G07F 17/3237* (2013.01); *H04W 4/021* (2013.01); *H04W 4/70* (2018.02)

(58) Field of Classification Search
  CPC .. G06Q 20/32; G06Q 20/322; G06Q 20/3224; G06Q 20/327; G06Q 20/3278; G06Q 20/40; G06Q 30/0261; A63F 13/216; A63F 2300/205; A63F 3/06; A63F 3/0645; H04W 4/021; H04W 4/02; H04W 4/80
  See application file for complete search history.

(56) References Cited

U.S. PATENT DOCUMENTS

| | | | |
|---|---|---|---|
| 7,811,172 | B2 | 10/2010 | Asher |
| 8,162,738 | B2 | 4/2012 | Erickson |
| 8,469,790 | B1 | 6/2013 | Itkis et al. |
| 8,523,669 | B1 | 9/2013 | Krietemeyer |
| 8,678,905 | B2 | 3/2014 | Aligizakis et al. |
| 8,876,608 | B2 | 11/2014 | Shepherd et al. |
| 8,965,416 | B2 | 2/2015 | Moshir et al. |
| 9,039,508 | B1 | 5/2015 | Arnone et al. |
| 9,070,250 | B2 | 6/2015 | Kelly et al. |
| 9,142,086 | B2 | 9/2015 | Porco |
| 9,208,652 | B2 | 12/2015 | Aligizakis |
| 9,218,715 | B2 | 12/2015 | Price et al. |
| 9,317,995 | B2 | 4/2016 | Nyman et al. |
| 9,367,990 | B2 | 6/2016 | Carter |
| 9,373,116 | B1 | 6/2016 | Kerr |
| 9,467,222 | B1 | 10/2016 | Pollmann et al. |
| 10,225,873 | B2 | 3/2019 | Menon |
| 2004/0259626 | A1 | 12/2004 | Akram et al. |
| 2005/0181875 | A1 | 8/2005 | Hoehne et al. |
| 2007/0117609 | A1 | 5/2007 | White et al. |
| 2008/0076528 | A1 | 3/2008 | Nguyen et al. |
| 2009/0042633 | A1* | 2/2009 | Yacenda ................ G07F 17/32 463/17 |
| 2009/0203448 | A1 | 8/2009 | Lupo |
| 2009/0247287 | A1 | 10/2009 | Voutes |
| 2011/0029399 | A1 | 2/2011 | Asher et al. |
| 2012/0089468 | A1* | 4/2012 | Guziel ................ G06Q 20/20 705/16 |
| 2012/0214582 | A1 | 8/2012 | Marek |
| 2013/0035149 | A1 | 2/2013 | Oakes |
| 2013/0102394 | A1 | 4/2013 | Seitz |
| 2014/0200075 | A1 | 7/2014 | Krietemeyer |
| 2014/0370959 | A1 | 12/2014 | Yacenda |
| 2014/0378219 | A1 | 12/2014 | Arnone et al. |
| 2015/0050988 | A1 | 2/2015 | Nichols et al. |
| 2015/0194013 | A1 | 7/2015 | Herold |
| 2015/0265915 | A1 | 9/2015 | Nelson et al. |
| 2016/0055709 | A1 | 2/2016 | Amaitis et al. |
| 2016/0093156 | A1 | 3/2016 | Aligizakis et al. |
| 2016/0155300 | A1 | 6/2016 | Mound |
| 2017/0011380 | A1 | 1/2017 | Govindarajan et al. |
| 2017/0249634 | A1 | 8/2017 | Cage |
| 2018/0324735 | A1* | 11/2018 | Zhang ................ H04W 8/005 |

* cited by examiner

SYSTEM, APPARATUS AND METHOD FOR FACILITATING REMOTE LOTTERY WAGER COMMUNICATIONS

PRIORITY CLAIM

This application is a continuation of, claims the benefit of and priority to U.S. patent application Ser. No. 15/704,387, filed on Sep. 14, 2017, which claims the benefit of and priority to U.S. Provisional Patent Application No. 62/552,212, filed on Aug. 30, 2017, the entire contents of which are each incorporated by reference herein.

BACKGROUND

The present disclosure relates generally to gaming and lottery systems, and more particularly to facilitating lottery wagering communications in remote wagering environments.

Many types of lottery wagering environments exist. For example, traditional lottery tickets offered for drawing games and instant games can be purchased in a traditional retail environment, where the player enters a retail establishment that sells the lottery tickets, purchases the ticket(s) and plays the ticket(s) according to game rules. In some jurisdictions, Internet or online wager communications are permitted, which allow the player to buy his or her ticket(s) in electronic form over a network such as the Internet, for example. In other jurisdictions, a player may search for and store desired purchases remotely, such as over the Internet, for example, but must then pay for and/or otherwise conduct the lottery wager transaction within the confines and/or defined territory of an authorized lottery retailer.

In this last example, lottery wager communications can transpire in several ways. For example, a player may use his or her mobile communications device to select and store a desired lottery purchase over the Internet, enter into an authorized facility, call up the desired purchase and conduct the purchase transaction in person at a point-of-sale (POS) retail device. Such transaction can be conducted by the retail clerk or self-service POS device scanning a code representing the desired transaction, at which time payment can be processed and the desired product (e.g., ticket) can be presented to the player. In some embodiments, the player receives a physical ticket and in other embodiments, the player's desired product is made available electronically, wherein the wager is associated with a player account or other player identifier such that any winnings can be appropriately credited to the player.

In other examples, the player need not appear in person at the retailer terminal, but must be within range of a private network, such as a Bluetooth network centralized around one or more retailer terminals within an authorized facility. Bluetooth is a wireless communication protocol for exchanging data between devices, such as mobile phones, tablets, keyboards, computer mice, printers, PC networks, media players, video game consoles and other devices. The Bluetooth network can operate via a Bluetooth-enabling transceiver (e.g., Bluetooth adaptor or dongle) coupled to the retailer terminal that permits the retailer terminal to receive communications remotely from wireless devices paired to the transceiver. Exemplary environments include gas stations, convenience stores and other lottery retail establishments. However, these environments have limitations. For example, unlike Wifi service, Bluetooth only permits pairing of the transceiver with a single mobile device at a time. Thus, when more than one player in or around an authorized lottery facility wishes to conduct a transaction, players must wait for an existing connection between another mobile device and the transceiver to be disconnected before a second or further mobile device may connect in order to process the transaction. In addition to the problems associated with crowded facilities, some devices process transactions more quickly whereas others do not. Even further, the distance between a mobile device and the transceiver can affect the speed and effectiveness of processing the desired transaction. All of these circumstances can result in lengthy wait times and frustrated customers, who may decide not to proceed with their desired transaction.

BRIEF SUMMARY

The present disclosure relates generally to a system, apparatus and method wherein lottery transaction devices are equipped with multiple Bluetooth-enabled transceivers, a lottery server manages identifiers associated with the transceivers at each lottery transaction device, and issues an identifier of an available transceiver to a requesting mobile communications device at the time the mobile device desires to consummate a player's desired transaction. The system, apparatus and method further operate to facilitate portions of the desired transaction communication separate from the Bluetooth network so as to limit the time spent by a mobile device communicating directly with the Bluetooth-enabled lottery transaction device. In various embodiments, the mobile device issues a disconnect call to the lottery transaction device directly after the desired lottery transaction has been communicated.

Additional features are described herein, and will be apparent from the following Detailed Description and the figures.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can be used to support regulated state or governmental lotteries, private gaming corporations, authorized lottery retailers, and/or other entities that provide legal gaming to customers. While the examples are described principally with reference to regulated state lotteries, it will be appreciated that the same solutions may be applied in other wagering or regulated gaming applications. The example embodiments described below include references to a lottery server, a lottery game engine, a lottery transaction device and a lottery system. Such a server, engine, device and/or system may be implemented as a single computing system or as a collection of computing systems or subsystems which are communicatively coupled, and each component or subsystem of the exemplary server, engine, device and/or system can be implemented in hardware, software or a combination thereof. In various embodiments, each of the lottery server, lottery game engine and lottery transaction device has one or more processors and an associated memory storing instructions that, when executed by the one or more processors, cause the one or more processors to perform operations as described herein.

Figure 1:
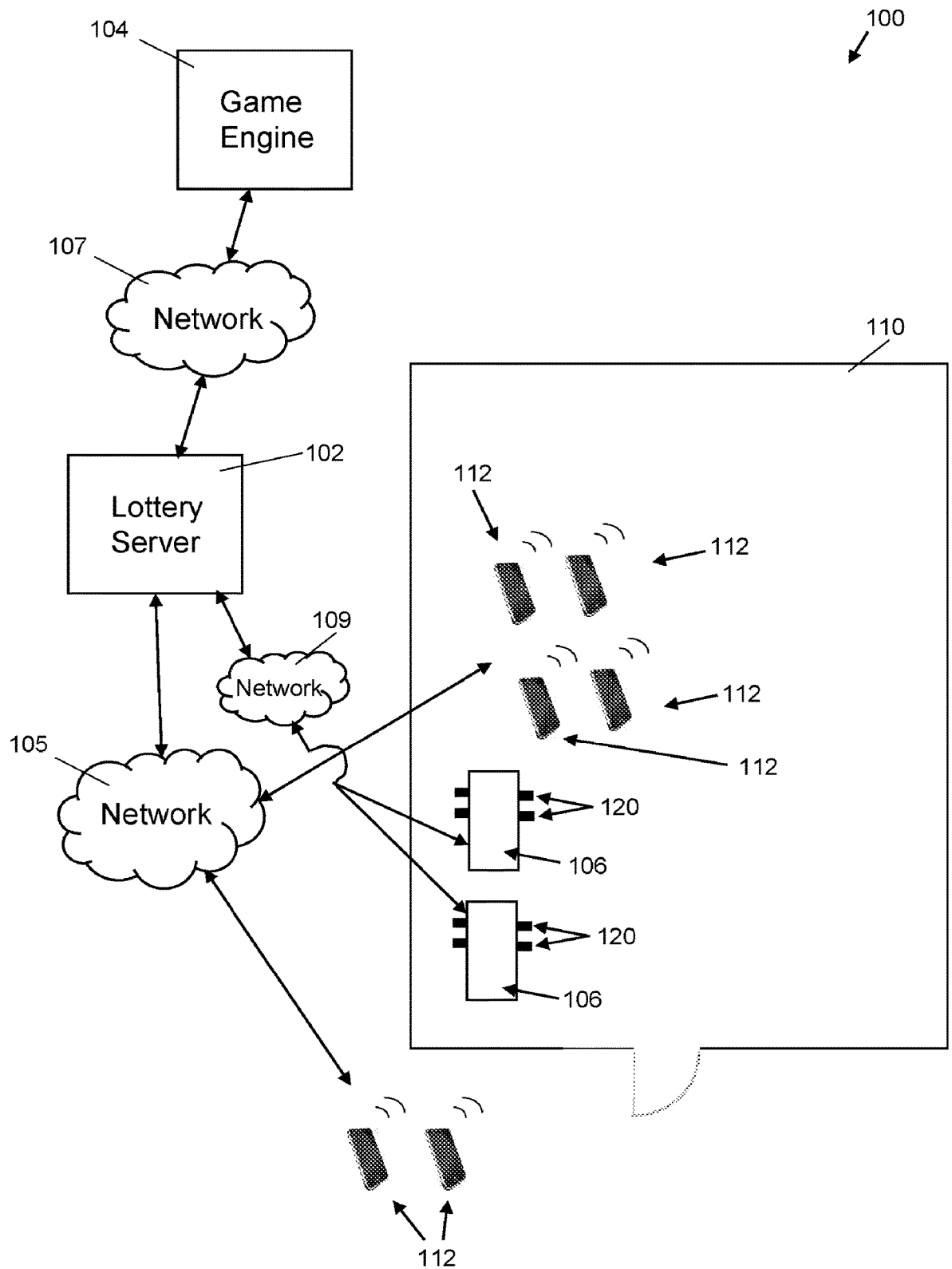
FIG. 1 is a schematic diagram of an exemplary lottery system in accordance with the present disclosure.

Referring now to FIG. 1, an exemplary system 100 in accordance with the present disclosure is illustrated, including a lottery server 102, a lottery game engine 104, and one or more lottery transaction devices 106, wherein the lottery transaction devices 106 are provided on site at an authorized lottery retailer location 110. The server 102, game engine 104 and lottery transaction devices 106 may include and/or be in communication with one or more databases to facilitate operations as described herein, as well as necessary and desired storage of system events, relevant programming and data.

As shown in FIG. 1, lottery transaction devices 106, which may be in the form of retailer point-of-sale (POS) terminals or may be separate devices from any POS terminals, and player mobile communications devices (e.g., smartphones, tablets and other personal communication devices) 112 communicate with the lottery server 102. The mobile communications devices 112 can communicate with the lottery server 102 over a network 105, such as the Internet, for example, whereas lottery transaction devices 106 may communicate directly with the lottery server 102 over a private network 109. Mobile communications devices 112 can be provided with one or more processors and an associated memory storing instructions that, when executed by the one or more processors, cause the one or more processors to perform operations as described herein. Mobile communications devices 112 can further include input and output mechanisms, including a physical or virtual keypad, a microphone, a display such as a touchscreen display, a speaker, a tactile output generator (e.g., vibration element) and other mechanisms as will be understood. Further, the mobile communications devices 112 generally include one or more device programs, such as system programs and application programs to perform various computing and/or communications operations. System programs may include an operating system, device drivers, programming tools, utility programs, software libraries and application programming interfaces (APIs), for example. Application programs may include messaging applications, a web browser application, media applications, database applications, location-based services applications, and lottery wagering applications, for example. Such application programs, or apps, may provide for displaying various graphical user interfaces (GUIs) to present information to and/or receive information from users of the mobile communications devices 112. For instance, the lottery wagering application may display an appropriate GUI to receive a touchscreen or spoken input from a user when selecting a game to be played or wagered upon, and may further provide another appropriate GUI to display activated games and/or wagers on the mobile devices 112.

In various embodiments, the lottery server 102 communicates over a separate private network 107 with the lottery game engine 104, and communicates over another private network 109 with lottery transaction devices 106. Network 105 can be a private network or a public network, such as the Internet, for example.

Each lottery transaction device 106 can include appropriate user input elements (e.g., keyboard, mouse, touchscreen interface), output elements (e.g., display screen, speaker), hardware (e.g., card readers, scanners, code readers) and software for processing in-person wager and other retail transactions, as will be understood. Each lottery transaction device 106 can further include appropriate hardware and software programming for processing remote wager transactions as described herein. For example, each lottery transaction device 106 can be provided with one or more Bluetooth-enabling transceivers (e.g., Bluetooth adaptors or dongles) 120. Each transceiver is a device including an antenna for transmitting and receiving information via radio waves. Transceivers can be connected to the lottery transaction device 106 via Universal Serial Bus (USB) ports, card slots, or any other means in order to provide communication pathways between paired Bluetooth devices such as mobile devices 112 and the lottery transaction device 106, as will be appreciated by those of ordinary skill in the art. In various embodiments, multiple lottery transaction devices 106 are provided in an authorized lottery facility such as that shown at 110, and multiple transceivers are secured to each transaction device 106, as illustrated in FIG. 1.

The lottery server 102 is accessible by the mobile devices 112 over network 105. The lottery server 102 includes programming for displaying available lottery games which may be purchased, wherein such purchase constitutes a wager on the game. The lottery server 102 further includes programming for receiving selections from players via their mobile devices 112, including selections of desired types of games to play, selections of specific games to play, selections of game indicia within particular games, selections of numbers of tickets to purchase and selections associated with financial transactions, such as a player account, loyalty points, credit or debit card or other information necessary to process purchase transactions and deposit winnings. In various embodiments, the lottery server 102 includes programming for facilitating shopping cart processing and related transactions. For example, a player may browse available games for a particular jurisdiction by accessing the lottery server 102 over the Internet. The player may then desire to purchase one or more certain games, and may place the desired games in a virtual shopping cart through appropriately instructing the lottery server 102 via a suitable interface. Such an interface can be provided via a lottery wagering application ("app"), as described above, which may be downloaded or otherwise presented on the mobile device 112 in order to facilitate player interactions as described herein. For example, the player may tap on a display screen of their mobile device 112 when the app is running to select a game item to be added to his or her cart, or may swipe the display screen as part of a drag-and-drop approach to adding the desired game item into his or her cart. The player can also log in or otherwise identify himself or herself to the lottery server 102 so that the player's cart is associated with the player and/or the player's mobile device 112. Such identification can be provided via the player entering a user name and password, a code or other form of identification. In various embodiments, the player can anonymously purchase a voucher, such as by paying cash to a retailer for the voucher, wherein the voucher represents a credit in the amount of the player's payment. The voucher can include a code that, when read by, or entered into, the lottery wagering app, establishes a credit for the player to use in playing desired games as described herein.

It will be appreciated that the mobile lottery wagering app may be used in isolation or may be combined with other player interactions to facilitate the communications and transaction processing described herein. For example, a player may use a different computing device (e.g., PC, laptop, tablet) to access the lottery server 102, log in to a player account, and select desired games for his or her shopping cart. Later, the player may access the mobile app on his or her mobile device 112 when within range of the Bluetooth network via the lottery transaction device 106 in order to purchase the items in the shopping cart. Regardless of how the shopping cart is filled, it is stored by the lottery server 102 and associated with the player and/or the player's account.

In addition to storing each player's virtual shopping cart, the lottery server 102 manages multiple broadcast identifiers associated, respectively, with the multiple transceivers 120 communicatively coupled to the lottery transaction devices 106. A broadcast identifier is a descriptor used to identify a particular Bluetooth-enabled transceiver 120. If, for example, a lottery transaction device 106 has four Bluetooth-enabled transceivers 120 communicatively coupled thereto, then the lottery server will assign a specific broadcast identifier to each of the four transceivers 120. For example, a broadcast identifier may include a string of characters including numbers, letters, symbols and/or a combination thereof.

In various embodiments, the lottery server 102 maintains a list or pool of all identifiers associated with all in-use Bluetooth-enabled transceivers 120 for all transaction devices 106 at all locations. For example, a particular site 110 in FIG. 1 may have two lottery transaction devices 106 with four transceivers 120 coupled to each lottery transaction device 106. If three of the eight total transceivers are in use, the lottery server 102 will store the identifiers for the three specific broadcast identifiers corresponding to the in-use Bluetooth-enabled transceivers for these two lottery transaction devices 106 at location 110. The lottery server 102 will similarly store corresponding identifier and in-use transceiver information for other locations. When a player approaches the location 110, the player can open the mobile app on his or her mobile device 112, and scan the area for the broadcast identifiers associated with transceivers 120, without connecting to any one of the transceivers 120. It will be appreciated that the mobile devices 112 may be inside a structure at the site 110 or outside of the structure when communicating with lottery transaction devices 106. For example, if the site is a convenience store with gas pumps, the lottery transaction devices 106 may be inside the store's structure as shown in FIG. 1, some of the mobile devices 112 may be inside the structure, and others of the mobile devices 112 may be outside of the structure, such as in the instance where the users of the mobile devices are pumping gas into their vehicles, for example. At any particular time, the lottery server 102 knows which of the transceivers 120 are in use, and establishes a pool or list of the broadcast identifiers associated with the in-use transceivers so as not to present the associated identifiers to a mobile device 112 when a request is received to establish a connection to the lottery transaction device 106. The pool of in-use broadcast identifiers thus corresponds to a subset of the Bluetooth-enabled transceivers, wherein each of the transceivers corresponding to the identifiers in the subset is in-use and thus unavailable to be communicatively coupled to a mobile device.

By managing a list of the broadcast identifiers associated with in-use Bluetooth-enable transceivers, the lottery server 102 facilitates ad hoc Bluetooth network connectivity between mobile devices 112 and the lottery transaction devices 106. In the event all transceivers are in use at the time a new request for connection is received, the lottery server 102 may hold on to the request until a transceiver becomes available.

Figure 2:
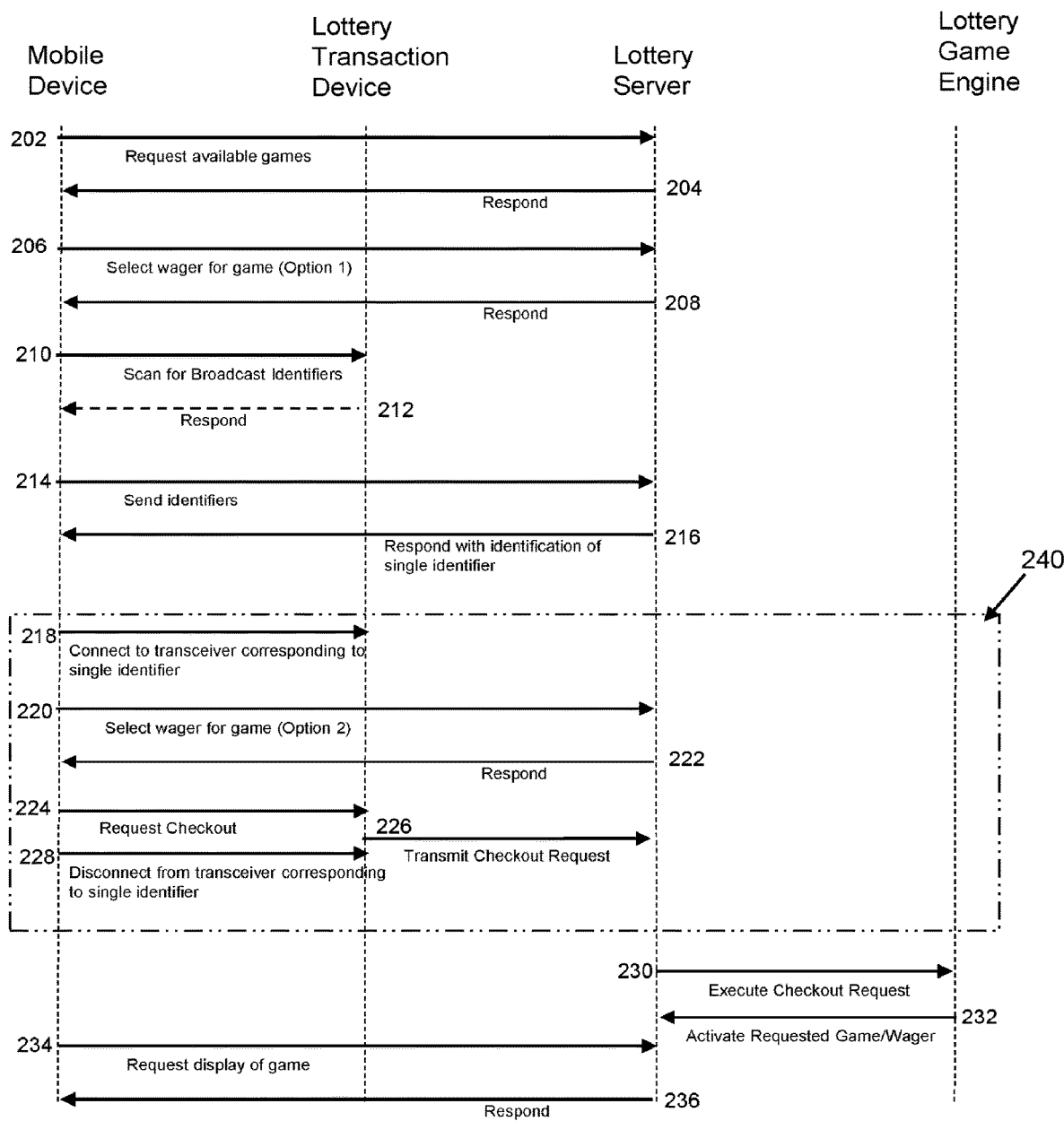
FIG. 2 is a diagram illustrating an exemplary transaction sequence according to embodiments of the present disclosure.
Figure 5:
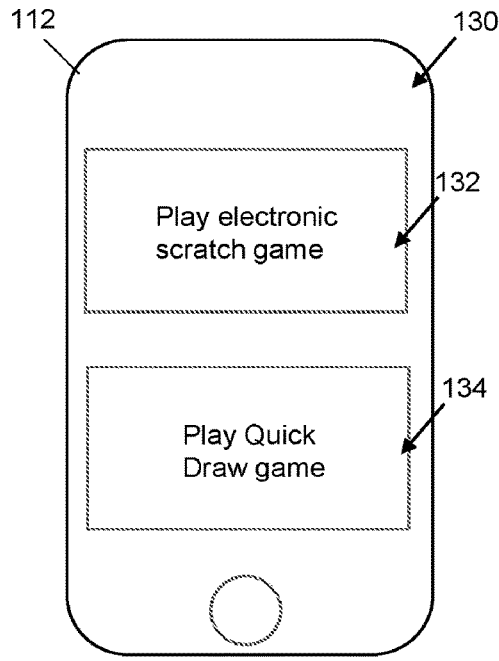
FIGS. 5 through 8 illustrate exemplary device displays according to embodiments of the present disclosure.
Figure 6:
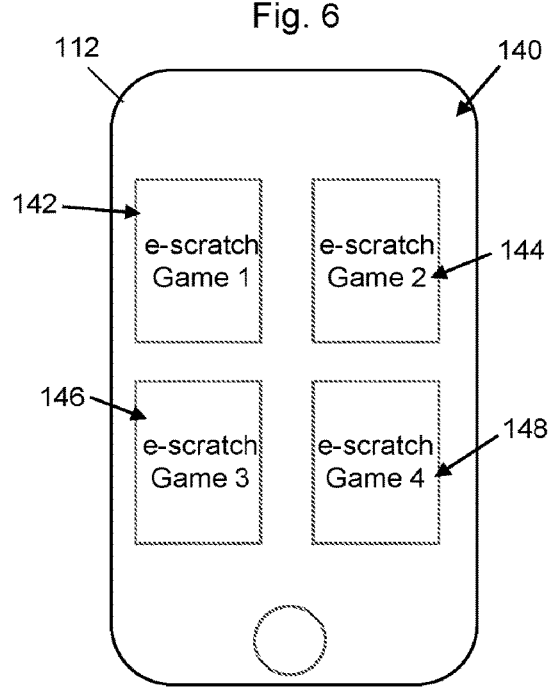

FIG. 2 illustrates communications flow and devices involved in various embodiments of the system, apparatus and method as presently disclosed. As shown at 202 in FIG. 2, the mobile device employing the lottery wagering app sends a request to the lottery server via network 105 to obtain available games to purchase and/or wager on. As at 204, the lottery server returns the available games for viewing on a display of the mobile device. FIGS. 5 and 6 illustrate exemplary user interface displays 130, 140 for users of the mobile devices 112 to use in selecting a game. As shown in display 130 of FIG. 5, the user may be presented with selection options for a type of game, such as an electronic instant or scratch-based game 132 or a quick draw-based game 134. As shown in display 140 of FIG. 6, the user may be presented with specific games 142, 144, 146, 148 in the display 140 after selecting a specific type of game.

In various embodiments, prior to connecting to the Bluetooth network, the player may select games to be placed in a player shopping cart for later purchase, and such selection is sent to the lottery server 102 over network 105 as at 206 in FIG. 2. The lottery server 102 can respond by acknowledging the selection(s) in the player's virtual shopping cart, as at 208. In various alternative embodiments, the player shopping cart selections are sent to the lottery server 102 via network 105 after the mobile device 112 is connected to the lottery transaction device 106 via an available Bluetooth-enabled transceiver 120, as indicated at 220. The lottery server 102 can similarly respond at that time by acknowledging the selection(s) in the player's virtual shopping cart, as at 222.

Figure 7:
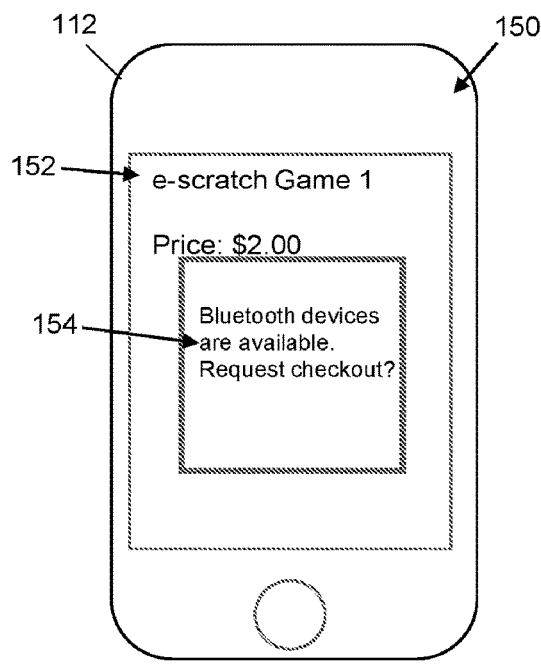

The lottery server 102 stores the selected cart items. In various embodiments, the lottery server 102 assigns a transaction or cart identifier to the player's stored cart items, wherein the cart identifier is a generated string of symbols, letters and/or numbers (i.e., an indicia string) representing the items in the player's cart. The cart identifier can be sent to the mobile device 112 at the time the user of the mobile device 112 requests the cart checkout, such as at 222 in FIG. 2, for example. As at 210, when the mobile device determines it is at a location that contains the necessary hardware to wager over the Bluetooth endpoint, it will scan for the broadcast identifiers associated with the Bluetooth-enabled transceivers 120 secured to the lottery transaction devices 120 at the location. Once the identifiers are received, as at 212, the mobile device 112 issues a request to the lottery server 102 to reserve one of the transceivers for communication with the mobile device 112. In issuing the request, the mobile device 112 sends the list of broadcast identifiers to the lottery server 102 as at 214. As shown in FIG. 7, an overlay image 154 is provided atop the current display (e.g., of an available game 152) indicating the presence of the Bluetooth connection opportunities (i.e., "Bluetooth hotspot") and prompting the user to request checkout and thereby connect to an available transceiver.

Returning to FIG. 2, as at 216, once the lottery server 102 receives the list of broadcast identifiers, the lottery server 102 checks the pool of in-use identifiers to determine whether at least one of the transceivers corresponding to the identifiers in the list is available to be communicatively coupled to the mobile device 112. Once the lottery server 102 determines that one of the transceivers corresponding to the list of broadcast identifiers is available, the lottery server 102 issues an identification of such identifier to the mobile device 112, as at 216. At such time, as at 218, the mobile device 112 issues a connect call to the transceiver associated with the identification of the identifier received from the lottery server 102, and the Bluetooth connection is established between the mobile device 112 and the lottery transaction device 106. The lottery server 102 also updates the list of in-use identifiers to include the identifier issued to the mobile device 112. In this way, the lottery server 102 knows which transceivers are not available for connection to other mobile devices. As at 224, the mobile device 112 then sends a request to the lottery transaction device 106 to complete a purchase transaction, i.e., a cart checkout request, for the items in the player's cart. The cart checkout request can include the cart identifier generated by the lottery server 102 which has been sent to the mobile device 112, wherein the cart identifier does not reveal the specifics of the desired games or wagers of the player. In this way, those specifics are not communicated via the Bluetooth network and do not risk being compromised. Further, the cart identifier provides a shorter message for delivery and, hence, shortens the required network connectivity time for the mobile device-to-lottery transaction device communications. In various embodiments, the mobile device 112 sends the cart identifier, i.e., the purchase completion request just after the mobile device 112 issues the connect call and becomes connected to the designated Bluetooth-enabled transceiver. Such action can occur, for example, after the user selects the request checkout option 154 presented on display 150 of mobile device 112 in FIG. 7, without requiring any further prompts or selections by the user.

Once the cart checkout request is received and confirmed by the lottery transaction device, the mobile device can send a disconnect call to the lottery transaction device as at 228, at which time the transceiver which had been communicatively coupled to the mobile device 112 is released from its pairing to the mobile device 112. The cart checkout request is also transferred from the lottery transaction device 106 to the lottery server 102 as at 226. The lottery server 102 then updates the list of in-use identifiers to exclude the identifier associated with the just-used transceiver, and the transceiver is now available for connection to other mobile devices. The lottery server 102 can then execute the requested transaction. By centrally managing the in-use broadcast identifier list for one or multiple locations via the lottery server, embodiments of the present disclosure facilitate the desired communications of multiple devices at the one or more locations while minimizing bottlenecks. Such central management via the lottery server also facilitates making any system-wide operational and/or functional changes as part of ongoing system optimization, for example.

Figure 8:
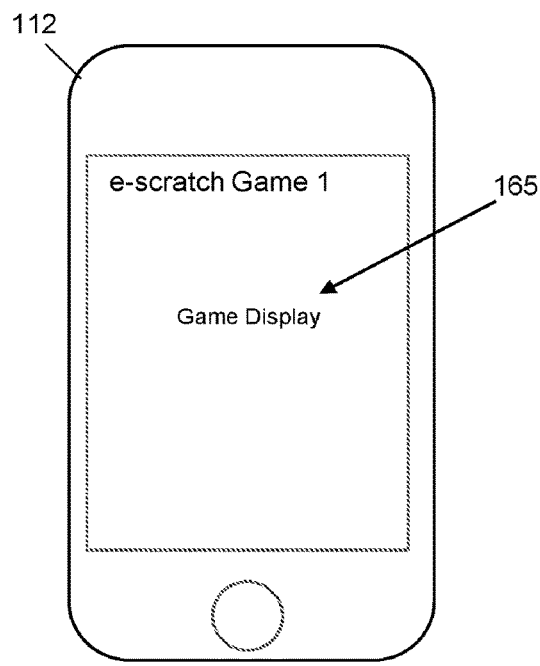

In executing the requested cart checkout transaction, the lottery server 102 can handle financial-related aspects through debiting of a player account, processing a credit or debit card transaction, debiting a player loyalty account or other similar transaction as will be understood in the art. The lottery server 102 will further execute the game/wager selection aspects via communication over network 107 to the lottery game engine 104 as at 230, which registers and activates the desired game or wager for the requesting player, and communicates such activation back to the lottery server as at 232. Once activated, the player can seek to play the game via the mobile app or other device, by navigating to the appropriate screen to see a display of the activated game, for example. In so doing, the mobile device 112 issues a reveal request to the lottery server 102 over network 105 as at 234, and the lottery server 102 responds with the appropriate game reveal as at 236 over network 105. It will be appreciated that the player can play the purchased game after the connection to the Bluetooth-enabled transceiver has been disconnected. Results of quick-draw games, such as Keno games, can be watched and electronic instant (i.e., scratch-based) games can be played on the mobile device 112. FIG. 8 provides an exemplary reveal display 165 on the mobile device 112. Further, the player can play the game anywhere the network 105 connection to the lottery server can be established, and using any player device, while not being able to purchase further wagers/games until the player visits another Bluetooth-enabled location. Additionally, any winnings associated with play of the game can be credited to the player without requiring the player to be connected to the lottery transaction device 106.

Figure 3:
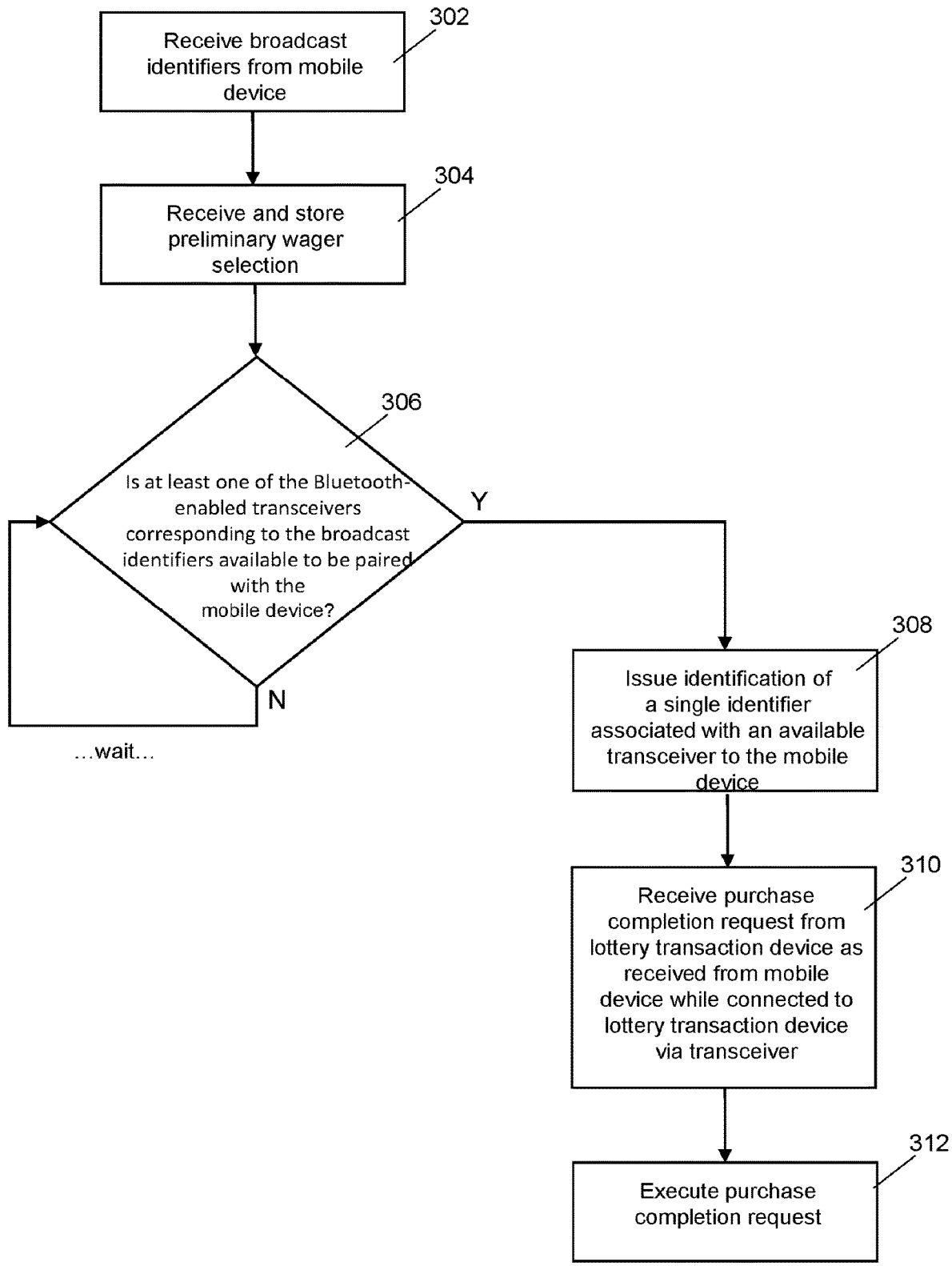
FIGS. 3 and 4 are exemplary flow diagrams illustrating communications and transaction processing steps according to embodiments of the present disclosure.

FIG. 3 illustrates method steps involved in accordance with various embodiments disclosed herein. As shown in FIG. 3, the lottery server 102 receives the broadcast identifiers from a mobile device 112, as at step 302, and further receives and stores the preliminary lottery game selection of the user, as at step 304. The preliminary lottery game selection corresponds to items that the user may store in his or her virtual shopping cart, which are desired for purchase but wherein the purchase transaction has not yet been consummated. As noted above, the preliminary lottery game selections may be communicated from the mobile device 112 to the lottery server 102, or may be communicated from a different device to the lottery server 102. Regardless, the preliminary lottery game selections are associated with the user of the mobile device 112 such as through a player account or other form of identifying the player. Further, the preliminary lottery game selection can be sent to, and/or received by, the lottery server 102 prior to the mobile device 112 establishing a Bluetooth network connection with the lottery transaction device 106, or while the mobile device 112 is connected to the lottery transaction device via the Bluetooth network. Additionally, the preliminary lottery game selection can be represented as a cart identifier so as to cloak the actual lottery game selections and further so as to shorten the message for subsequent delivery over the Bluetooth network.

As shown at 306, after receiving the broadcast identifiers in step 302, and regardless of the timing of receiving and storing the preliminary lottery game selection in step 304, the lottery server 102 determines at step 306 whether at least one of the Bluetooth-enabled transceivers corresponding to the broadcast identifiers is available to be paired with the mobile device 112. This can be performed by comparing the list of broadcast identifiers sent by the mobile device 112 with the pool of in-use broadcast identifiers maintained by the lottery server 102. If there is an available transceiver, then at step 308, the lottery server 102 issues an identification of a single identifier to the mobile device 112, wherein the single identifier corresponds to an available Bluetooth-enabled transceiver. If no transceiver is currently available, the lottery server 102 can wait a defined amount of time and hold the request for connection until a transceiver is determined to be available at step 306. It will be appreciated that the communications in steps 302-308 can occur over separate network 205 (e.g., the Internet) in FIG. 1 and do not require communication over the Bluetooth network. After the mobile device 112 uses the single identifier to connect to the corresponding transceiver, the lottery server 102 receives, as at step 310, a purchase completion request from the lottery transaction device 106, which had received the purchase completion request from the now-connected mobile device 112. The purchase completion request can take the form of a checkout request from the mobile device 112, which may include the cart identifier following the single broadcast identifier, in various embodiments. As at step 312, the lottery server 102 can then execute the requested purchase completion request on behalf of the requesting player, as described elsewhere herein.

Figure 4:
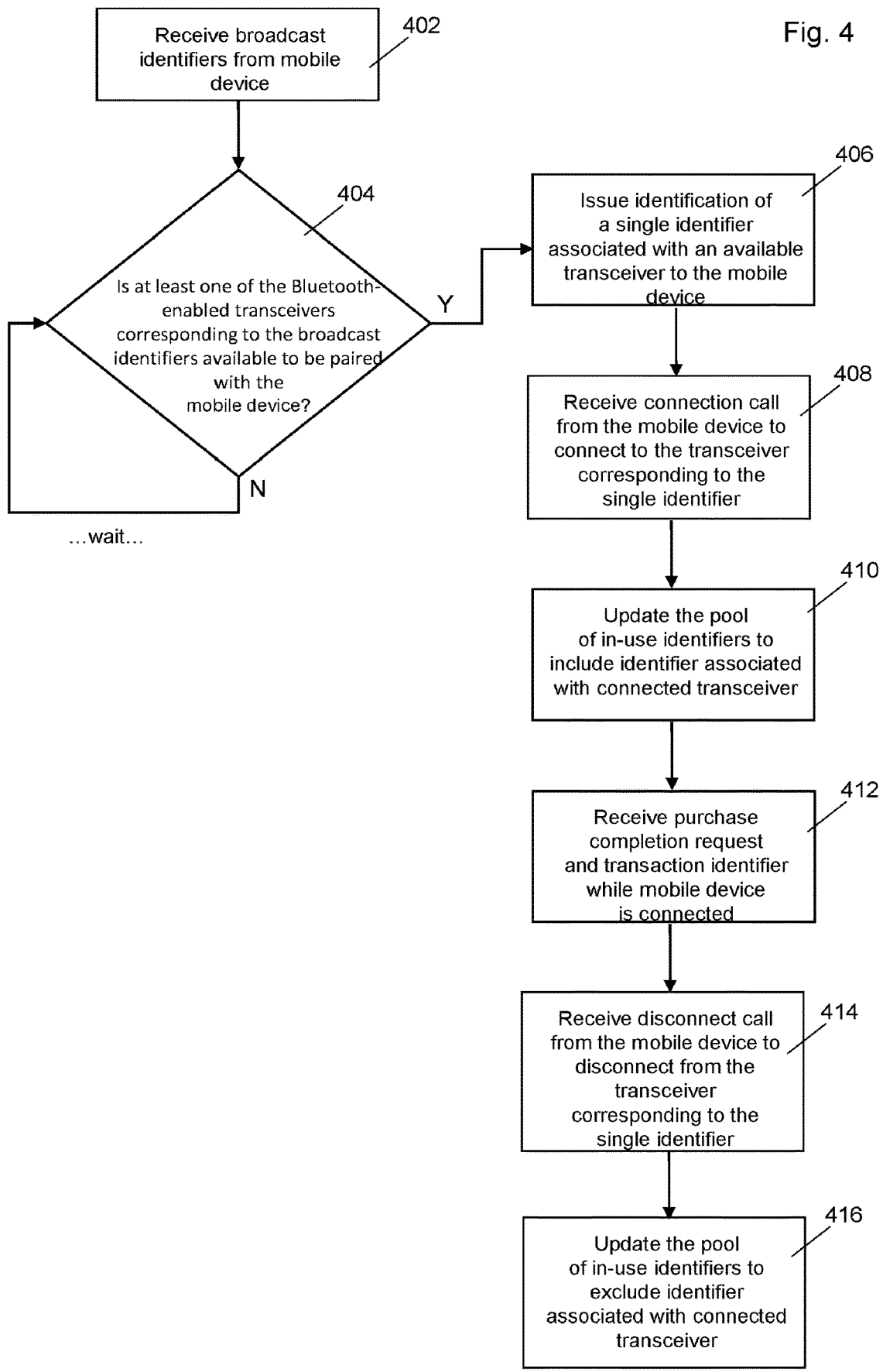

FIG. 4 illustrates method steps involved in accordance with other various embodiments disclosed herein. As shown at step 402, the lottery server 102 receives the broadcast identifiers from a mobile device 112. As shown at step 404, the lottery server 102 determines at step 306 whether at least one of the Bluetooth-enabled transceivers corresponding to the broadcast identifiers is available to be paired with the mobile device 112. If so, then at step 406, the lottery server 102 issues an identification of a single identifier to the mobile device 112, wherein the single identifier corresponds to an available Bluetooth-enabled transceiver. If no transceiver is currently available, the lottery server 102 can wait a defined amount of time and hold the request for connection until a transceiver is determined to be available at step 404. At step 408, the lottery transaction device 106 to which the determined available transceiver is coupled receives a connect call from the mobile device 112, and the Bluetooth connection between the mobile device and the transceiver corresponding to the single identifier is made. At step 410, the lottery server 102 updates the pool of in-use identifiers to now include the single identifier. At step 412, the lottery transaction device 106 receives the purchase completion request from the now-connected mobile device 112. The purchase completion request can involve the mobile device 112 sending the identified single broadcast identifier to become connected to the associated transceiver, followed by the mobile device sending the cart identifier. Once the purchase completion request is transmitted, the mobile device 112 is no longer required to be connected to the designated transceiver. Accordingly, as at step 414, the mobile device 112 issues a disconnect call to the lottery transaction device 106, whereby the mobile device 112 is now disconnected from the transceiver corresponding to the single identifier. At such time and as at step 416, the lottery server 102 updates the pool of in-use identifiers to exclude the single identifier, thereby making the transceiver associated with the previously identified single identifier available to be connected to another device. Further financial and game processing then occur as described elsewhere herein. In various embodiments, the lottery server 102 performs step 416 prior to further processing of the requested purchase transaction so as to maximize the ability for mobile devices 112 to connect to the lottery transaction device 106 to initiate transactions.

In various embodiments, a system according to the present disclosure provides one or more lottery transaction devices, multiple Bluetooth-enabled transceivers communicatively coupled to the lottery transaction device(s) and a lottery server, wherein the lottery transaction device(s) and lottery server are operable to perform the functions described herein. It will be appreciated that the system as described can further provide the lottery game engine operable to perform the functions described herein.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention is claimed as follows:

1. A lottery transaction device comprising:
a wireless transceiver;
a processor; and
a memory device that stores a plurality of instructions, which when executed by the processor responsive to a mobile device being in wireless communication with the wireless transceiver after a remote lottery server determines that the wireless transceiver is available, cause the processor to:
receive, from the mobile device, a request to complete a purchase of a lottery game,
transmit, via a network and to the remote lottery server, the request to complete the purchase of the lottery game,
following the remote lottery server completing the purchase of the lottery game, receive, via the network and from the remote lottery server, data associated with a completed purchase of the lottery game, and
transmit, to the mobile device, the data associated with the completed purchase of the lottery game.

2. The lottery transaction device of claim 1, wherein the mobile device and the wireless transceiver are in wireless communication following a reservation of a broadcast identifier associated with the wireless transceiver.

3. The lottery transaction device of claim 1, wherein when executed by the processor responsive to an occurrence of a mobile device disconnection, the instructions cause the processor to release the wireless transceiver from being in wireless communication with the mobile device.

4. The lottery transaction device of claim 1, wherein the processor comprises a processor of a retailer point-of-sale terminal.

5. The lottery transaction device of claim 1, wherein the wireless transceiver comprises an antenna configured to transmit and receive information via radio waves.

6. A lottery transaction device comprising:
a plurality of wireless transceivers;
a processor; and
a memory device that stores a plurality of instructions, which when executed by the processor, cause the processor to:
responsive to a first mobile device being in wireless communication with a first of the plurality of wireless transceivers:
responsive to a first request to complete a purchase of a first lottery game being received from the first mobile device, transmit, to a lottery server, the request to complete the purchase of the first lottery game, and
responsive to receipt, from the lottery server, of data associated with a completed purchase of the first lottery game, transmit, to the first mobile device, the data associated with the completed purchase of the first lottery game, and
while the first mobile device is in wireless communication with the first of the plurality of wireless transceivers and responsive to a second, different mobile device being in wireless communication with a second, different wireless transceiver of the plurality of wireless transceivers:
responsive to a second request to complete a purchase of a second, different lottery game being received from the second mobile device, transmit, to the lottery server, the request to complete the purchase of the second lottery game, and responsive to receipt, from the lottery server, of data associated with a completed purchase of the second lottery game, transmit, to the second mobile device, the data associated with the completed purchase of the second lottery game.

7. The lottery transaction device of claim 6, wherein at least one of the plurality of wireless transceivers comprises a Bluetooth-enabled transceiver.

8. The lottery transaction device of claim 6, wherein the first mobile device and the first wireless transceiver are in wireless communication following a first reservation of a first broadcast identifier associated with the first wireless transceiver.

9. The lottery transaction device of claim 8, wherein the second mobile device and the second wireless transceiver are in wireless communication following a second reservation of a second broadcast identifier associated with the second wireless transceiver.

10. The lottery transaction device of claim 6, wherein when executed by the processor responsive to an occurrence of a mobile device disconnection associated with the first mobile device, the instructions cause the processor to release the first wireless transceiver from being in wireless communication with the first mobile device.

11. The lottery transaction device of claim 10, wherein when executed by the processor responsive to the occurrence of the mobile device disconnection associated with the first mobile device, the instructions cause the processor to maintain the wireless communication between the second wireless transceiver and the second mobile device.

12. The lottery transaction device of claim 10, wherein the processor comprises a processor of a retailer point-of-sale terminal.

13. A method of operating a lottery transaction device, the method comprising:

responsive to a first mobile device being in wireless communication with a first of a plurality of wireless transceivers:

responsive to a first request to complete a purchase of a first lottery game being received from the first mobile device, transmitting, to a lottery server, the request to complete the purchase of the first lottery game, and responsive to receipt, from the lottery server, of data associated with a completed purchase of the first lottery game, transmitting, to the first mobile device, the data associated with the completed purchase of the first lottery game, and while the first mobile device is in wireless communication with the first of the plurality of wireless transceivers and responsive to a second, different mobile device being in wireless communication with a second, different wireless transceiver of the plurality of wireless transceivers:

responsive to a second request to complete a purchase of a second, different lottery game being received from the second mobile device, transmitting, to the lottery server, the request to complete the purchase of the second lottery game, and responsive to receipt, from the lottery server, of data associated with a completed purchase of the second lottery game, transmitting, to the second mobile device, the data associated with the completed purchase of the second lottery game.

14. The method of claim 13, wherein at least one of the plurality of wireless transceivers comprises a Bluetooth-enabled transceiver.

15. The method of claim 13, wherein the first mobile device and the first wireless transceiver are in wireless communication following a first reservation of a first broadcast identifier associated with the first wireless transceiver.

16. The method of claim 15, wherein the second mobile device and the second wireless transceiver are in wireless communication following a second reservation of a second broadcast identifier associated with the second wireless transceiver.

17. The method of claim 13, further comprising, responsive to an occurrence of a mobile device disconnection associated with the first mobile device, releasing, by a processor, the first wireless transceiver from being in wireless communication with the first mobile device.

18. The method of claim 16, further comprising, responsive to the occurrence of the mobile device disconnection associated with the first mobile device, maintaining, by the processor, the wireless communication between the second wireless transceiver and the second mobile device.

19. The method of claim 13, wherein the processor comprises a processor of a retailer point-of-sale terminal.

* * * * *